_United States Patent Office_

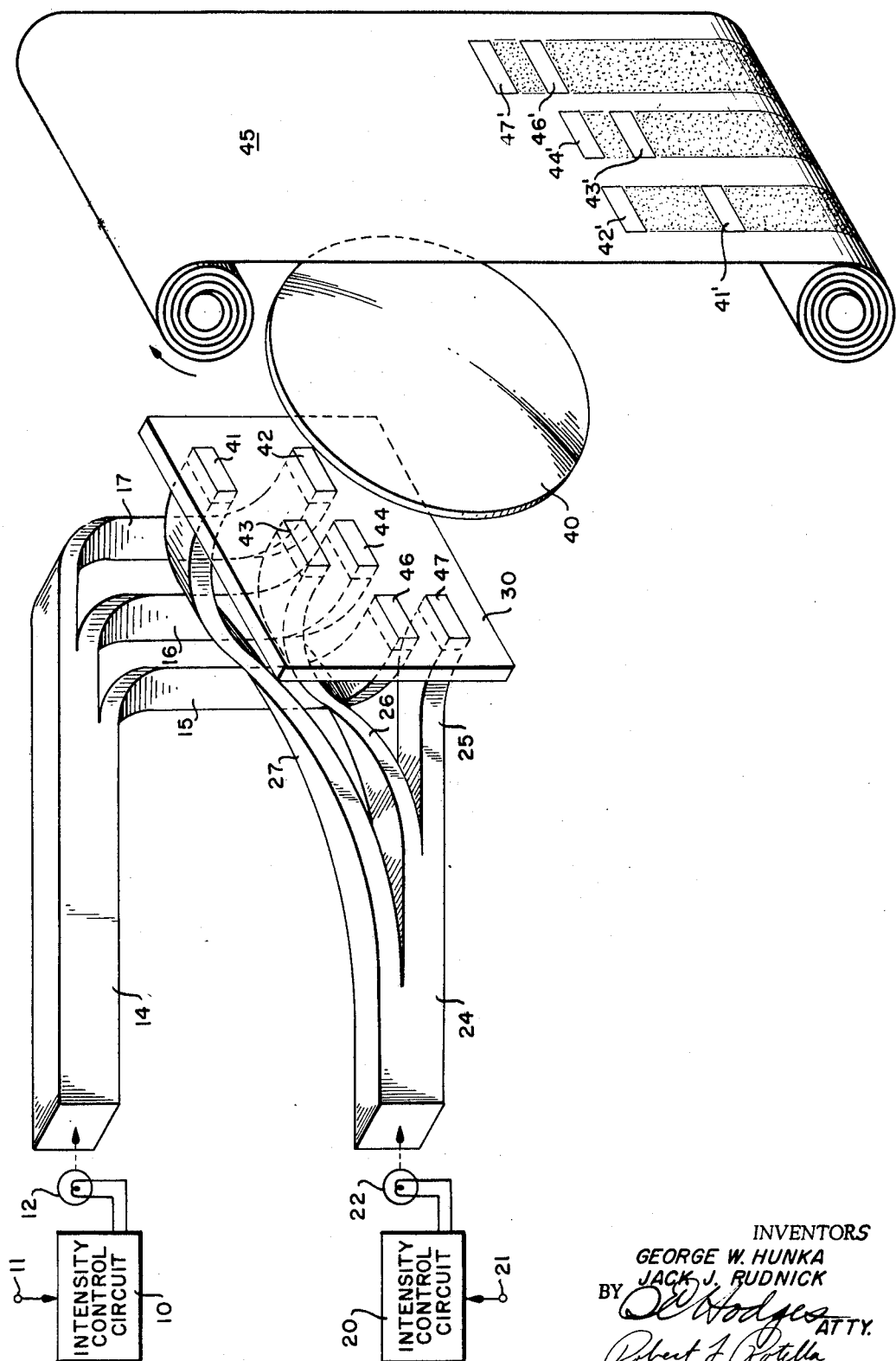

3,500,438
Patented Mar. 10, 1970

---

3,500,438
OPTICAL TIME DELAY PROGRAM RECORDER
George W. Hunka, Churchville, and Jack J. Rudnick,
  Philadelphia, Pa., assignors, by mesne assignments, to
  the United States of America as represented by the
  Secretary of the Navy
Filed Jan. 25, 1967, Ser. No. 612,293
Int. Cl. G01d 9/42
U.S. Cl. 346—108                                   10 Claims

---

ABSTRACT OF THE DISCLOSURE

Optical apparatus for time delay-programming a plurality of electrical signals including lamps for producing intensity-modulated light and fiber optical conductors for arranging the light conductors from the respective signals in a prescribed geometry and a film medium for recording the light output from the signals comprising each program.

---

The present invention relates to programming systems and, more particularly, to a system for programming a plurality of electrical signals by optical means.

In the electrical measurements field, it is often necessary to process a plurality of information-carrying electrical signals to produce a single output. In certain cases, it is required to delay some of the signals by a certain interval of time before being combined to form the single output. Prior methods for accomplishing this include the use of time delay lines. Such lines have the disadvantage of being extremely expensive where great precision is required. Furthermore, it is often necessary to lengthen or shorten the amount of time delay for a particular program which is not possible with a given length of delay line.

Therefore it is an object of the present invention to provide a novel apparatus for programming a plurality of electrical signals with time delay.

It is a further object of the present invention to provide means for processing electrical signals by means of an optical and photographic film system.

Still another object of the present invention is to provide a fiber optical array for time delaying a plurality of electrical signals.

A further object of the present invention is to provide optical time delay programming apparatus utilizing moving photographic film.

These and other objects of the present invention are achieved by providing a novel optical time delay programming apparatus which includes a plurality of electrical signal sources coupled to respective illuminating means which convert the signals to intensity-modulated light radiation. Associated with each illuminating means is a light conducting member which channels the light to an array plate. At the array plate, each light conducting member is divided into a plurality of bundles corresponding to the number of programs required. For each program, the respective bundles from each light conducting member are fixed on the array in an in-line arrangement—the spacing between the bundles representing a particular time delay interval. The light from the bundles are focused onto a moving photographic film which records the program in the form of a density modulated track.

The principles of the present invention will be better understood from the following detailed description taken in conjunction with the accompanying drawing in which the sole figure is a diagrammatic view in perspective of a preferred form of the optical time delay programming apparatus in accordance with the principles of the invention.

As shown in the figure, one preferred embodiment of the invention shows a plurality of sources of electrical signals 11 and 21. The electrical signals may be representative of any parameters whatsoever and may comprise any required number. By way of example, the present invention may be utilized to beamform acoustic array signals to produce a highly directive steerable antenna. Spatial delay programs can be computed for any required angular directivity knowing the array parameters. In one successful construction of the invention an optical time delay programmer was designed to provide beamforming capability for a 40 element acoustic array. Forty delay programs were generated using the invention.

The electrical signals 11 and 21 are connected to intensity control circuits 10 and 20, respectively, which converts the signals to light radiation by means of illuminating sources such as lamps 12 and 22. The resulting light radiation varies in intensity as the amplitude of the respective electrical signals.

The light waves impinge upon the front surface of respective light conducting members 14 and 24 and are channeled therethrough in a manner well-known in the art. For example the light conducting members may comprise fiber optic bundles which are capable of transmitting light information around curves. The light conductors 14 and 24 may be any convenient length in order to terminate at the array plate 30. At the array plate, the light conductors are branched off according to the number of programs required. Thus, light conductor 14 is branched into conductors 15, 16 and 17 and conductor 24 is branched into conductors 25, 26 and 27. Conductors 15 and 25 are situated on the array plate to form a first program. Conductors 16 and 26 form a second program and conductors 17 and 27 form a third program. It is to be understood that while a three-program, two-source system is described herein, a system may comprise any required number of programs fed by any number of sources.

The branched conductors may be fastened to array plate 30 by any suitable means such as brackets or slots. The terminating ends of the branched conductors form flat planar edges 41–44, 46 and 47 which are capable of projecting the light radiation from illuminating sources 12 and 22 through lens 40 onto the moving recording medium 45.

Medium 45 is a photosensitive film which records the variable intensity illumination as a density modulated track. By the action of imaging lens 40 the illuminated edges of the branched light conductors situated on the array plate 30 are reversed and projected onto film 45 as images 41′–44′, 46′ and 47′ corresponding, respectively, to the numbered light conductor edges.

As the film medium 45 is moved successive areas of each film track are exposed to the information-carrying light signals from sources 12 and 22. The film medium 45 possesses the inherent ability to integrate light exposures. Thus, each track represents the summed output of the various sources comprising each program. Furthermore, the output includes a time delay factor which is arrived at in the following manner.

Consider the program comprised of images 41′ and 42′ from the branches light conductor faces 41 and 42, respectively. As the film recording medium 45 is drawn past lens 40 a given increment of area on the program track is exposed first to be the image 42′ and then, some time later to image 41′. Clearly, the amount of time delay introduced into each program is governed by the distance between conductor faces 41 and 42 on the array plate 30. The greater distance between the faces, the greater the time delay in the resulting program. Furthermore, if the faces 41 and 42 were reversed on plate 30, the relative time displacement between images 41′ and 42′ would similarly be reversed and a time advancement effectuated. The other two programs, formed by images 43' and 44' and 46' and 47', respectively, are established in a similar manner. To utilize the programs the film medium 45 may be passed through further optical instrumentation to convert the density variations on the film back to electrical signals or the information may be retained in recorded form for future analysis and utilization.

Obviously many modifications and variations of the present invention are possible in the light of the above teachings.

What is claimed is:

1. Apparatus for processing a plurality of information-carrying electrical signals into time delay programs comprising:
   a plurality of means for converting said electrical signals to respective light signals, the intensity of each light signal being proportional to the amplitude of its respective electrical signal;
   means for arranging said respective light signals in a plurality of geometric arrays; and
   means for recording simultaneously in continuous tracks said plurality of geometrically arranged light signals.

2. Apparatus as set forth in claim 1 wherein: said arranging means includes means for conducting said respective light signals from a first location adjacent said converting means to said plurality of geometric arrays at a second location.

3. Apparatus as set forth in claim 2 wherein: said conducting means comprises fiber optic bundles.

4. Apparatus as set forth in claim 3 wherein: each of said fiber optic bundles are branched into $n$-branches, where $n$ is the number of programs.

5. Apparatus as set forth in claim 4 wherein: said fiber optic branches containing signals from different converting means are arranged to form a plurality of dissimilar geometric arrays.

6. Apparatus as set forth in claim 5 wherein: said branches are disposed on said array, the respective distances between the branches causing corresponding time difference between said signals in said programs.

7. Apparatus as set forth in claim 6 wherein: said recording means comprises light responsive film, successive continual areas of said film being exposed to the light signals comprising said programs.

8. Apparatus as set forth in claim 7 wherein: said film integrates the light output from said branches thereby forming a density modulated track representative of the summed output of said signals.

9. Apparatus as set forth in claim 8 wherein: each of said programs is recorded as a separate track on said film.

10. Apparatus as set forth in claim 9 further including lens means for projecting the light output from said branches onto said film.

References Cited

UNITED STATES PATENTS 2,891,166  6/1959  Piety.
2,982,175  5/1961  Eisler _____ 350—96 X JOSEPH W. HARTARY, Primary Examiner U.S. Cl. X.R.

340—173; 350—96